United States Patent [19]

Frank

[11] 4,057,337

[45] Nov. 8, 1977

[54] COMPACT VIEWER

[75] Inventor: Lee Fitzpatrick Frank, Rochester, N.Y.

[73] Assignee: Eastman Kodak Company, Rochester, N.Y.

[21] Appl. No.: 682,303

[22] Filed: May 3, 1976

[51] Int. Cl.² .......................................... G03B 21/28
[52] U.S. Cl. ........................................ 353/26 R; 353/78
[58] Field of Search .................. 353/27, 26, 25, 121, 353/77, 78, 122; 355/3 R, 5, 3 BE, 3 P, 16, 17, 44

[56] References Cited

U.S. PATENT DOCUMENTS

| | | | |
|---|---|---|---|
| 2,143,214 | 1/1939 | Selenyi | 178/7.3 |
| 2,777,745 | 1/1957 | McNaney | 355/5 |
| 2,986,442 | 5/1961 | Broding | 355/16 |
| 3,051,044 | 8/1962 | McNaney | 355/5 |
| 3,115,075 | 12/1963 | Alexander | 355/5 X |
| 3,168,857 | 2/1965 | Hutto | 353/121 |
| 3,306,160 | 2/1967 | Dinhobel et al. | 355/44 X |
| 3,445,163 | 5/1969 | O'Hoshima et al. | 353/77 |
| 3,704,608 | 11/1972 | Waly | 355/46 |
| 3,824,008 | 7/1974 | Smith | 353/26 A |

Primary Examiner—Harry N. Haroian
Attorney, Agent, or Firm—John D. Husser

[57] ABSTRACT

A compact viewer having an active display belt supported for movement around an endless loop and a projection station for scan-exposing successive image portions, from the image medium to be viewed, onto successive portions of the belt where they are temporarily stored for viewing. In a preferred embodiment images are selectively scan exposable at opposite sides of the viewing station to facilitate bidirectional image retrieval. An erasure station is provided along the belt path at a location spaced from the viewing station to prepare the belt for display of new images.

15 Claims, 4 Drawing Figures

COMPACT VIEWER

CROSS REFERENCE TO RELATED APPLICATIONS

Reference is made to U.S. application Ser. No. 682,305, entitled "Improved Active Light Control Device", and filed May 5, 1976 in the names of Joseph Y. Kaukeinen and Lee F. Frank and to U.S. application Ser. No. 682,304, entitled "Display Device Having Image Sense Reversal Capability", and filed May 5, 1976 in the names of Joseph Y. Kaukeinen and Lee F. Frank.

BACKGROUND OF THE INVENTION

1. Field of Invention

The present invention relates to improved, compact image viewing apparatus and more particularly to viewing apparatus utilizing an active display surface to facilitate compactness.

2. Background of Invention

One limiting factor on the presently expanding growth of micro-information systems, e.g., those using microfilm or microfiche, is the need for improved and more compact magnifying viewers for displaying the information. At present, viewer designs are usually developed: (1) using expensive, large f-number, highly corrected lenses to obtain a shorter projection distance and thus more compact viewers; (2) using less expensive lenses, longer projection distances, and thus less compactness in the overall viewer configuration; or (3) using a compromise between these approaches. An excellent discussion of the problems involved in designing a compact micro-information viewer is set forth in U.S. Pat. No. 3,704,068.

The alternative approach disclosed in U.S. Pat. No. 3,704,068 is to provide a large number of lenslets each adequate to project the image of a small portion of a document, e.g., a single letter, over a very short projection distance. Although this approach has advantages, difficulties can be encountered in apparatus using the approach. For example, special information recording techniques are required for media using such viewers; thus the viewers would not be adaptable to media recorded in present microform formats. Also, optical alignment problems could adversely affect the cost or image quality of the apparatus. Further, the accuracy of optical alignment required during image retrieval can render image selection, from a microform file, difficult.

With regard to certain aspects of the information display technology, other than achieving compactness, the desirability of active display screens has been recognized. Cross-referenced, copending U.S. applications Ser. Nos. 682,304 and 682,305 disclose such active display screens and explain their utility as image intensifiers and as image storers, which facilitate the retrieval of images and conserve usage of the projection source.

Heretofore, however, it has not been recognized that active display screens can be utilized in improving the compactness of viewers.

SUMMARY OF THE INVENTION

Thus, it is an object of the present invention to provide improved viewing apparatus.

A more specific object of the invention is to provide compact apparatus for the viewing of micro-information.

Another object of the invention is to provide such compact viewing apparatus which incorporates means for providing facile retrieval and alignment of micro-information.

A further object of the present invention is to provide viewing apparatus which is improved with regard to the conservation of projection source energy.

The above and other objects and advantages are accomplished by the present invention which in one advantageous embodiment includes an active display surface capable of displaying and storing radiation patterns projected thereon and means for effecting a scanning projection, of an image to be viewed, onto the display surface. In one useful specific embodiment, the display screen is configured around an endless path and successive portions of an image to be displayed are scanned onto the screen with synchronous movement of the screen and image medium. Other advantageous structural features of the invention include an erasure station operative on the screen at a location out of the apparatus viewing area and a unique, dual-image, projection system which allows scanning impression of projected image portions on oppositely spaced sections of the display surface, to provide a capability of bidirectionally browsing and centering images recorded on the image medium.

BRIEF DESCRIPTION OF THE DRAWINGS

In the more detailed description of preferred embodiments of the invention set forth below, reference is made to the attached drawings which form a part of the application and in which.

DETAILED DESCRIPTION OF PREFERRED EMBODIMENTS

Figure 1:
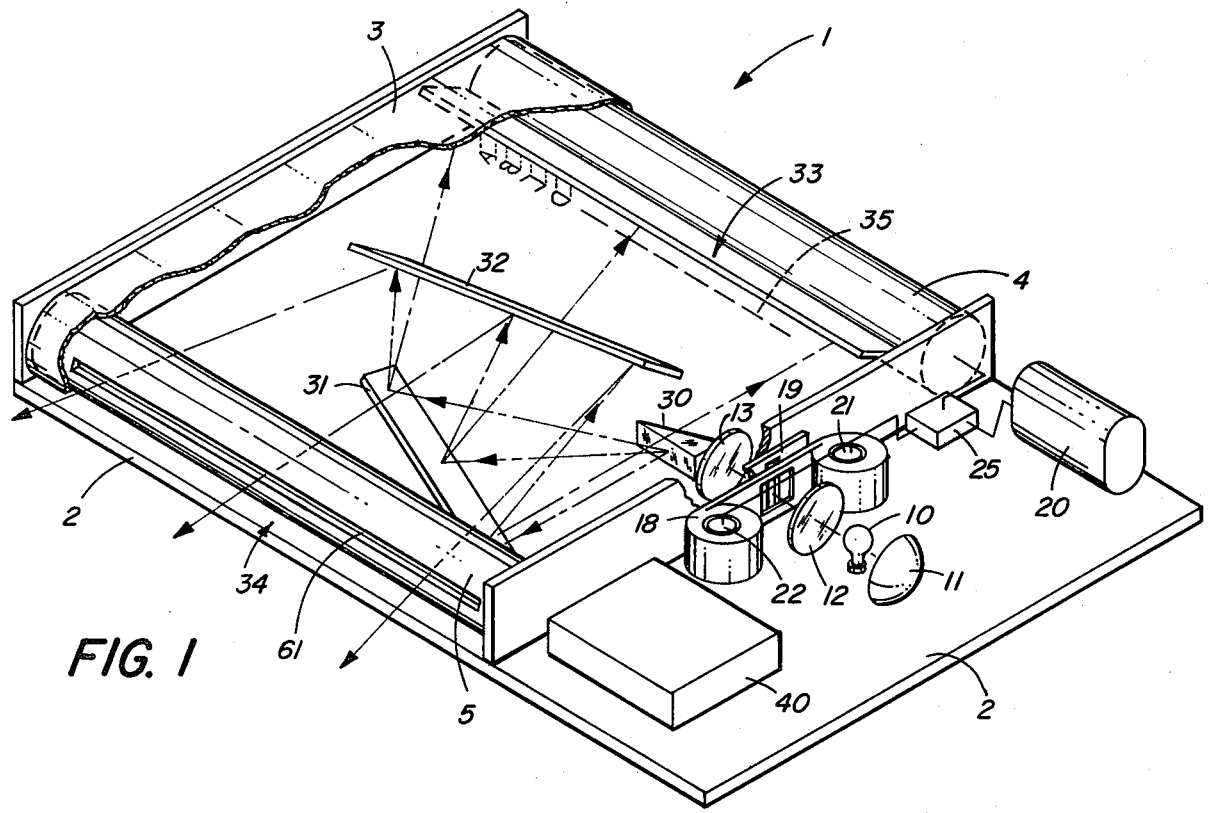
FIG. 1 is a perspective schematic view of one embodiment of viewing apparatus incorporating the present invention.

Referring to FIG. 1, the viewing apparatus 1 comprises a main housing 2, only a portion of which is shown, that supports the various sub-mechanisms of the viewers and which encloses the optical elements of the viewer, other than the viewing surface, in a substantially light-tight manner. Within the housing an active display belt 3 is mounted in an endless loop configuration around a belt drive roller 4 and belt guide plate 5. The belt is thus movable so that the successive areas thereof pass from a flat viewing orientation on the top, as shown in FIG. 1, around the roller 4 or guide plate 5 (depending on the direction of rotation) and along a flat path beneath the viewing plane.

Likewise mounted within the housing is an image projection system comprising light source 10, reflector 11, condenser lens 12 and projection lens 13. Means such as projection gate 19 having a scanning slit is provided on the housing for supporting a micro-information medium in the projection plane of the projection system. In the illustrated embodiment the medium is shown as strip microfilm in a cassette 18 having storage chambers on each side of the projection plane.

A reversible motor 20 is mounted within the housing and coupled by conventional drive linkages to belt drive roller 4 and to film drive means 21 and 22 which can drivingly engage film within the chambers of the cassette in any conventional manner. Thus, the film can be moved past the projection station from right to left of left to right as viewed in FIG. 1 while belt 3 is rotated respectively in a clockwise or counterclockwise direction. A conventional gear box 25 provides synchronization for the proper relative movement of the belt and film to achieve scanning exposure of film images onto the belt 3 in a manner next described.

Figure 3:
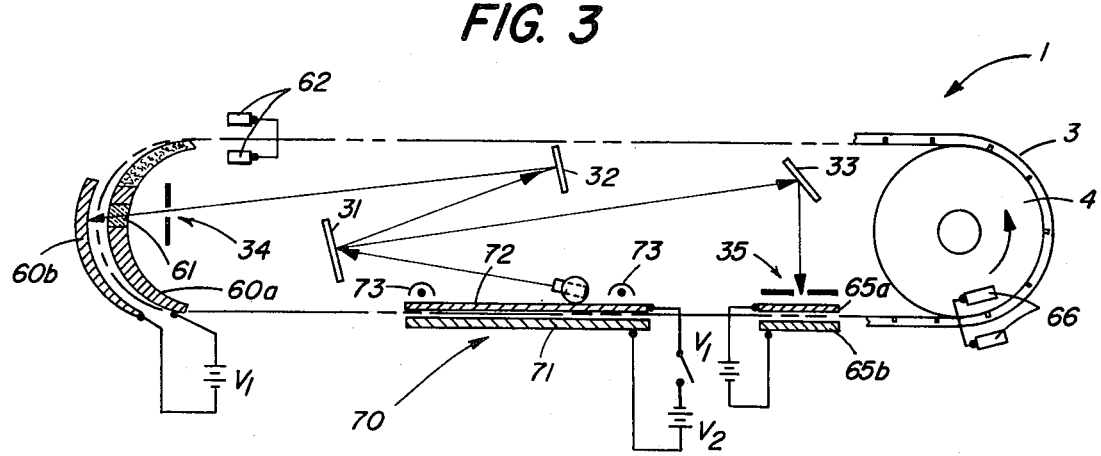
FIG. 3 is a schematic side view of apparatus such as shown in FIG. 1, more particularly illustrating the structure for controlling charge on the active display screen thereof.
Figure 2:
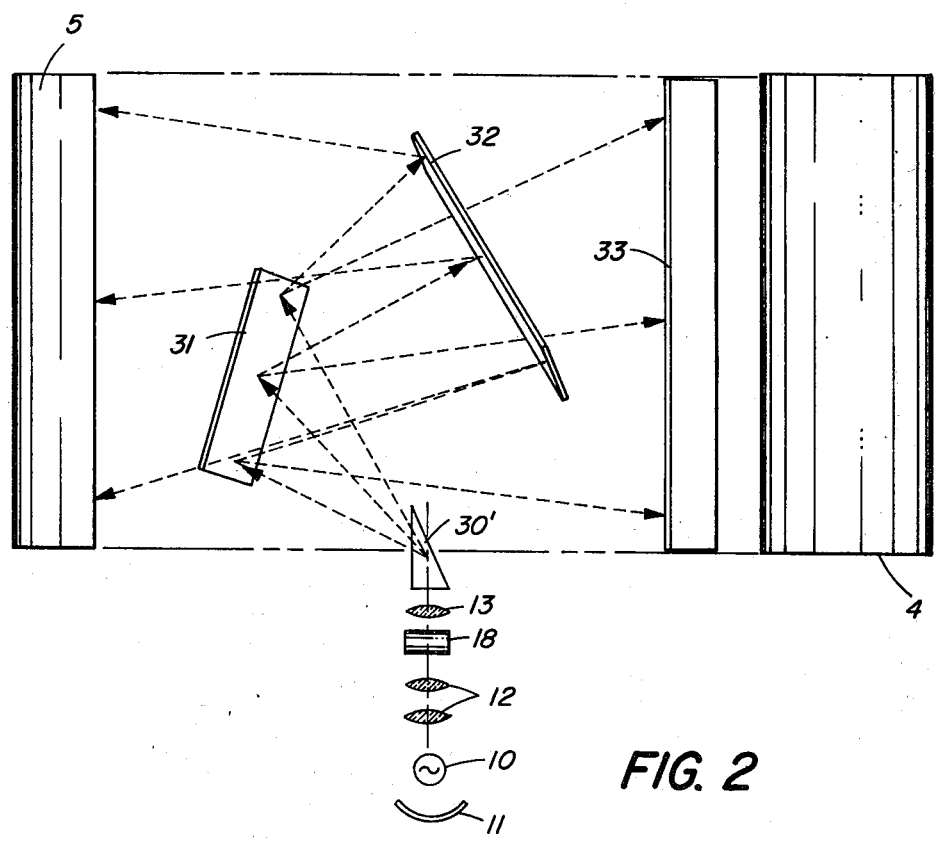
FIG. 2 is a schematic top view of apparatus similar to that shows in FIG. 1.

As shown in FIGS. 1-3, a portion of the film image at the projection gate 19 is illuminated and directed by lens 13 into a prism 30 which, in the case of a horizontal film advance such as shown in FIG. 1, has reflective surfaces capable of rotating the image segment 90° and directing it to an elongated reflective surface, such as mirror 31, located within and transversely across the loop formed by display belt 3. As shown in each of FIGS. 1-3, the projected light image, of the segment of a document area at the projection station, is directed by mirror 31 both to elongated mirror 32 and elongated mirror 33. This can be accomplished by locating mirror 32 to intercept only part of the projected light rays (as shown) or by constructing mirror 32 in the form of a beamsplitter. It will be appreciated after consideration of subsequent descriptions that the optical system could likewise be selectively operable to direct the image light to one recording station during film advance in one direction and to the other during film advance in the other direction, e.g., rotation of prism 30 or mirror 31 in response to film drive selection could effect this.

Image light reflected from mirror 32 passes to exposure station 34 and the image light reflected from mirror 33 passes to exposure station 35. Thus it can be seen that as the film and belt are moved at relative speeds, selected in proportion to the magnification of the image, successive portions of the document images on the film will be scan-exposed onto portions of the belt passing exposure stations 34 and 35. Referring only to FIG. 2, it can be seen that the apparatus embodiment shown therein indicates film feed can alternatively be in a direction orthogonal to the viewing surface. In such a modified embodiment, the prism 30' would be simplified, with no necessity for 90° image rotation.

Figure 4:
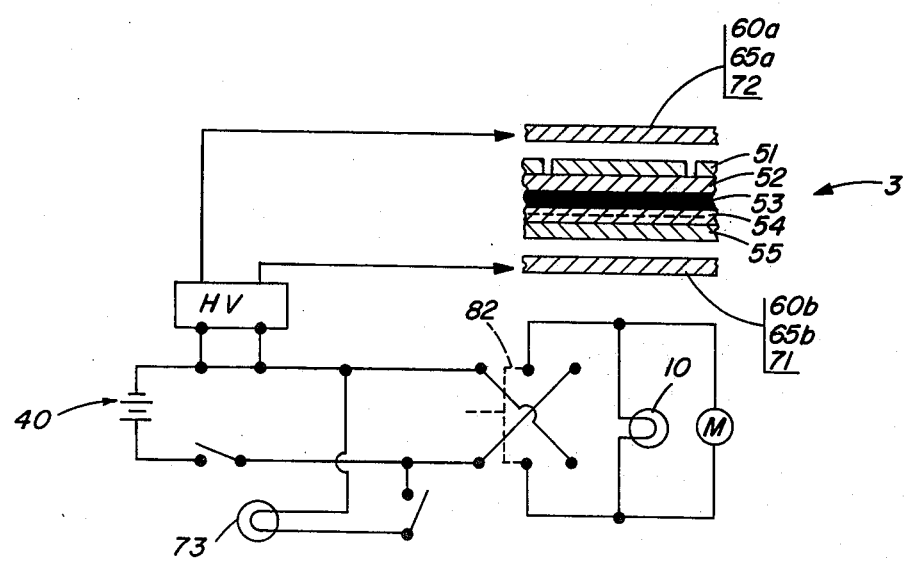
FIG. 4 is a schematic diagram illustrating electrical control for the apparatus shown in FIG. 1.

Completing the general description of the apparatus shown in FIG. 1, element 40 indicates an electrical power source(s) which are located within the housing and supply electrical energy to various elements of the apparatus, e.g., in the manner shown in FIGS. 3 and 4.

Considering now a particular embodiment of active display surfaces useful in accordance with the present invention, FIG. 4 shows an enlarged cross-section of a portion of the display belt 1. In this embodiment the belt comprises a first transparent conductive layer 51, which in operation is disposed innermost toward the rollers. Next to layer 51, in sequence, are a photoconductive insulator layer 52, an opaque insulator layer 53, an electro-optical layer 54 and a second outer conductive layer which is also substantially transparent. The transparent conductive layers can comprise film supports with thin evaporated metal coatings, e.g., of nickel. Photoconductive layer 52 can be a conventional organic photoconductor in a binder such as presently in commercial use and insulator layer 53 can be a pigmented film base such as Mylar film. The electro-optical layer in this embodiment is comprised of fine reflective dipole particles, such as aluminum flakes, dispersed in an elastomer matrix, as silicone rubber. More detailed description of the materials useful in the display belt and the method of fabricating such belts is set forth in the aforementioned copending U.S. application Ser. No. 682,305 entitled "Improved Active Light Control Device" and filed May 3, 1976, and U.S. application Ser. No. 682,304 filed May 3,1976, entitled "Display Device Having Image Sense Reversal Capability", both filed in the names of J. Y. Kaukeinen and L. F. Frank.

The modes in which images can be impressed for display on such belts are also described in the aforementioned applications. Briefly, when a light image is directed onto the photoconductive layer 52 of the element with potential applied across electrodes 51 and 55, an imagewise electric field is created across the electro-optical layer in areas corresponding to the light portion of the image. This field effects re-orientation of the reflective particles that are dispersed in the elastomeric matrix of the electro-optical layer, in a direction normal to the element surface. Reflective particles not under the influence of the field remain in an orientation generally parallel to the planar surface of the belt. Thus ambient light directed toward the outer surface of the belt (i.e., conductive layer 55) is reflected back toward the operator by the parallel oriented particles, but passes the perpendicularly oriented particles and is absorbed in the opaque layer. The operator is thus provided a viewable image corresponding to the projected light image. As pointed out in the patent applications cited in the preceding paragraph, bringing electrodes to an equal potential, after the initial charging and exposure, has been found to improve the image the image quality from some of the active display panels. The images can be readily erased by reversing the potential application across the electrodes 51 and 55 and providing a flooding light exposure under application of the reverse field.

Referring now to FIG. 3, it can be seen that means are provided within the housing of apparatus 1 for creating images on the belt 3 in the manner described above, as the belt rotates either in a clockwise or counterclockwise direction. Specifically, during clockwise rotation a segment of the belt passes between electrodes 60a and 60b which have a high voltage potential $V_1$ thereacross. The conductive layers 51 and 55 of the belt are respectively in electrical contact the electrodes 60a and 60b during scanning exposure of image portions projected from lens 13. If the conductive layers are on film supports, edge contact with the electrodes can be provided in a known manner. It will be understood that a portion, i.e., scan slit 61, of electrode 60a should be transparent, as well as electrically conductive, e.g., Nesa glass. After passing slit 61, the image moves between shorting electrodes 62 which bring layers 51 and 55 to the same potential for improved image formation as described in the aforementioned applications. Similar results are obtained during rotation in a counterclockwise direction as belt segments pass between charging electrodes 65a and 65b during exposure and subsequently between shorting electrodes 66. Erasure of images impressed on the belt 3 is effected by moving image bearing segments through erasure station 70 where electrodes 71 and 72, which have a potential $V_2$ thereacross, apply a reverse polarity field across the belt during its exposure to flood illumination from sources 73.

With certain embodiments of display belts disclosed in the aforementioned cross-referenced applications, it is desirable to utilize a lower potential for $V_1$ and to maintain the voltage across the belt during viewing. To implement use of such belts, the electrodes 60a and 60b and 65a and 65b could extend across the viewing surface to maintain the field created by $V_1$. In this embodiment, shorting electrodes 62 and 66 would be omitted.

It can be noted in FIGS. 3 and 4 that, at least, conductive layer 51 of the belt 3 is segmented by transverse air spaces in order to afford selective charging and discharging of separate areas of the belt. The charging plates 65a and 65b are spaced from shorting electrodes 66, and from erasure electrodes 71 and 72, by a distance longer along the path of belt travel than the distance between electrically insulative breaks in conductive layer 51. Therefore the potential operative across individual sections is not affected significantly by charging, shorting or erasing other sections. Charging plates 60a and 60b are similarly located with respect to shorting electrodes 62 and erase electrodes 71 and 72 for the same reason.

Considering now the overall operation of the apparatus 1, a cartridge containing an image bearing medium, e.g., a strip of microfilm, is inserted into the apparatus so that film drive mechanisms 21 and 22 are drivingly associated with film therein and so that film feed between the film chambers is supported by gate 19 in the projection plane of lens 13. The power supply 40 of the viewer is activated and the operator selects a direction for film advance by positioning switch 82 (see FIG. 4) for the reversible motor. Drive is then transmitted via gear means 25 to either of film drive member 21 or 22, depending on the direction of film advance selected, and simultaneously to belt drive member 4 to effect rotation in either a clockwise or counterclockwise direction at a velocity creating proper relative motion between the film and the belt for scanning images from the film onto the display belt. It is to be noted in FIG. 4 that lamp 10 is in parallel with the motor 20 so that the illumination of the lamp is proportional to the scanning speed of the belt to obtain more generally uniform exposure.

Assuming the film is advanced from right to left as viewed in FIG. 1, the belt 3 would be driven in a clockwise direction and portions of the film passing the film projection gate would be scanned onto the portions of the belt passing the exposure slit 61 of station 34. The photoconductive layer 52 will thus create across the electro-optical layer, imagewise electric fields corresponding to the projected light image pattern. The thus exposed portions of the belt then pass between field electrodes 62 and thereafter into the viewing station of the apparatus. Film advance can be continued in this manner until the operator reaches the image he or she wishes to peruse. It will be appreciated that the search for the desired image can be by visual or by automatic retrieval techniques which need not form a part of the present invention.

After the recorded images pass beyond the viewing station they move through the other exposure station (in this instance station 35) and on beneath the viewing surface to erase station 70. It is advantageous to provide conventional relay means operative in response to the selection of film and belt advance direction, to selective actuate the appropriate one of the exposure stations, while leaving the other station de-energized. As the recorded images pass through the erase station 70, the reverse polarity field $V_2$ and flood exposure neutralize the impressed imagewise field within the belt 3; and the reflective particles in the elastomeric matrix of the electro-optical layer 54 return to an orientation parallel to the belt surface. The erased portion of the belts are thus ready for impression of new images at the operative exposure station. However, if an image desired for viewing has passed beyond the viewing station during the clockwise belt advance, the drive of motor 20 can be reversed and image will return. The image return just described can be accomplished in at least two ways. In one embodiment, means can be provided to afford a time delay, after motor reversal, before actuation of the inoperative exposure station 35 (so that recorded but not yet erased images can be returned). In an alternative embodiment, the exposure station 35 can be rendered operative immediately upon reversal of the film drive and optical alignment provided such that the light image from the reversed film is impressed in register with the previously recorded image.

It will be apparent that if initial film movement was in the opposite direction i.e., left to right, the belt movement would be in counterclockwise direction and exposure station 35 would record information in the same manner described with respect to station 35. Erase station 70 would function in the same manner as during opposite belt rotation.

The invention has been described in detail with particular reference to preferred embodiments, but it will be understood that variations and modifications can be effected within the spirit and scope of the invention. For example, after consideration of the above description, it will be apparent that other optical scanning arrangements known in the art can be employed in practice of the invention and that alternative active display belts can be utilized.

I claim:

1. Improved image display apparatus comprising:
   a. an image display belt including a plurality of image storage and display portions, each of said belt portions having means for sensing and storing an incident imagewise radiation pattern and means for modulating uniform light incident on said storage and display portions in accordance with a stored pattern;
   b. means for supporting and moving said belt along an endless operative path;
   c. a first recording station, located along said endless path;
   d. an image projection station including means for receiving and supporting an information medium containing micro-images to be viewed and means for projecting, onto a portion of said display belt located at the recording station, a radiation pattern corresponding to the portion of the micro-image supported at said projection station;
   e. means for moving a received information medium past said projection station in a predetermined time relation with movement of said belt so as to provide scanning radiation exposure of successive micro-image portions onto successive portions of said belt; and
   f. an image viewing station located along said operative path and extending downstream from said recording station so that an entire image comprised of successively recorded image portions can be viewed thereat.

2. The invention as defined in claim 1 further including a second recording station located along said operative path on the opposite side of said viewing station from said first recording station and wherein said projecting and moving means can provide scanning exposure of successive image portions at each of said recording stations.

3. The invention as defined in claim 1 further including means, located along said operative path downstream from said first recording station and said viewing station, for erasing stored patterns from said belt.

4. The invention as defined in claim 7 wherein said display belt comprises a photo-electrical transducer layer and an electrically-responsive, light modulating layer.

5. The invention as defined in claim 4 wherein said belt further comprises transparent conductive layers sandwiching said transducer and said light modulating layers and further including means, located along said path downstream from said recording station and upstream from said viewing station, for bringing said conductive layers to substantially the same potential.

6. The invention as defined in claim 4 wherein said recording station comprises means for providing an electrical field across said layers during scanning exposure of said radiation patterns onto said successive belt portions.

7. The invention as defined in claim 6 further including means, located along said operative path downstream from said viewing station, for applying to said belt a second electric field of polarity opposite to that applied at said recording station and means for exposing said belt to uniform flood illumination during application of said second field.

8. Improved compact viewing apparatus comprising:
a. an elongated image display member having successive portions thereof each including means for sensing and storing a radiation pattern incident thereon and for modulating uniform light incident thereon in accordance with such stored radiation pattern;
b. means for moving said display member along an endless operative path;
c. a first recording station located along said path and including means for applying an electric field across portions of said member moving therepast;
d. means for receiving a record element containing a plurality of microimages to be displayed;
e. means for projecting magnified radiation patterns corresponding to successive portions of an image on a received record element onto successive portions of said display member at a rate synchronized in accordance with the rate of movement of said member past said first recording station and with the magnification of said patterns; and
f. a viewing station located downstream along said path from said first recording station and extending a distance such that an entire image can be viewed thereat.

9. The invention as defined in claim 8 wherein said display member includes a photo-electrical transducer layer and an electrically-responsive, light modulating layer.

10. The invention as defined in claim 8 further including means, located along said path at a location spaced from said recording and viewing stations, for erasing stored patterns from said display member.

11. The invention as defined in claim 8 further including a second recording station like said first recording station but on the opposite side of said viewing station therefrom and wherein said projecting means is operable to scan radiation patterns at each of said recording stations.

12. The invention as defined in claim 11 further including means located on the opposite side of each of said recording stations from said viewing station for erasing stored patterns from said display member.

13. The invention as defined in claim 11 wherein said moving means is selectively operable to move said member in opposite directions.

14. The invention as defined in claim 18 further including means for varying the intensity of said projected radiation pattern in response to the rate of movement of said display member.

15. The invention defined in claim 8 wherein said endless path is configured as a narrow elongated loop and said viewing station is located along an elongated substantially planar section of said path.

* * * * *

UNITED STATES PATENT AND TRADEMARK OFFICE
CERTIFICATE OF CORRECTION

PATENT NO. : 4,057,337
DATED : November 8, 1977
INVENTOR(S) : Lee Fitzpatrick Frank It is certified that error appears in the above-identified patent and that said Letters Patent are hereby corrected as shown below:

Column 7, line 12, "Claim 7" should read -- Claim 1 --.
Column 8, line 38, "Claim 18" should read -- Claim 8 --.

Signed and Sealed this

Twenty-first Day of February 1978

[SEAL]

Attest:

RUTH C. MASON
Attesting Officer

LUTRELLE F. PARKER
Acting Commissioner of Patents and Trademarks